United States Patent [19]

Matsuura et al.

[11] Patent Number: 4,662,905
[45] Date of Patent: May 5, 1987

[54] SELECTIVE GAS SEPARATOR

[75] Inventors: Junichi Matsuura, Kamakura; Yoshiteru Kobayashi, Yokohama; Osamu Kishiro, Atsugi; Yumiko Inagaki, Kawasaki, all of Japan

[73] Assignee: Itaru Todoriki, Director of Agency of Industrial Science and Technology, Tokyo, Japan

[21] Appl. No.: 683,516

[22] Filed: Dec. 19, 1984

[30] Foreign Application Priority Data

Dec. 23, 1983 [JP]  Japan ................................ 58-242192
Jul. 5, 1984 [JP]   Japan ................................ 59-138040
Oct. 26, 1984 [JP]  Japan ................................ 59-224091

[51] Int. Cl.$^4$ ...................... B01D 53/22; B01D 53/14
[52] U.S. Cl. ......................................... 55/158; 55/16; 55/68
[58] Field of Search ........................... 55/16, 68, 158; 423/244 R, 244 A, 246, 247

[56] References Cited

U.S. PATENT DOCUMENTS

| | | | |
|---|---|---|---|
| 2,849,082 | 8/1958 | Giammarco | 55/68 |
| 3,396,510 | 8/1968 | Ward et al. | 55/16 |
| 3,415,615 | 12/1968 | Blytas et al. | 423/246 |
| 3,658,463 | 4/1972 | Billings | 55/68 X |
| 3,758,603 | 9/1973 | Steigelmann et al. | 55/16 X |
| 3,758,605 | 9/1973 | Hughes | 55/158 X |
| 3,823,529 | 7/1974 | Hughes et al. | 55/16 |
| 3,980,605 | 9/1976 | Steigelmann et al. | 55/16 X |
| 4,042,669 | 8/1977 | Johnson et al. | 423/246 |
| 4,239,793 | 12/1980 | Matsuura et al. | 55/16 X |
| 4,255,591 | 3/1981 | Makin et al. | 55/16 X |
| 4,277,452 | 7/1981 | Kanehori et al. | 423/246 |
| 4,347,066 | 8/1982 | Doyle | 55/68 X |
| 4,508,694 | 4/1985 | Doyle et al. | 55/68 X |

FOREIGN PATENT DOCUMENTS

| | | | |
|---|---|---|---|
| 2545378 | 11/1984 | France | 55/68 |
| 45-1176 | 1/1970 | Japan . | |
| 16384 | 2/1978 | Japan | 55/68 |
| 53-31842 | 9/1978 | Japan . | |
| 94626 | 7/1980 | Japan | 55/16 |
| 137028 | 10/1980 | Japan | 55/16 |
| 19013 | 2/1982 | Japan | 423/246 |
| 207827 | 11/1984 | Japan | 55/16 |

OTHER PUBLICATIONS

D. J Haase & D. G. Walker, "The Cosorb Process", *Chemical Engineering Progress,* (vol. 70, No. 5), May 1974, pp. 74–77.

W. J. Ward, III & W. L. Robb, "Carbon Dioxide—Oxygen Separation: Facilitated Transport of Carbon Dioxide Across a Liquid Film", *Science,* vol. 156, Jun. 16, 1967, pp. 1481–1484.

Collman et al, "Picket Fence Porphyrins", *Synthetic Models For Oxygen* Binding Hemoproteins, J. Am. Chem. Soc. /97:6/ Mar. 19, 1975, pp. 1427–1430.

Stynes et al., "Reaction Between Iron Porphyrins & Co. A Kinetz Model For Myoglobin", *J. of the Chem. Soc., Chem. Com.,* No. 10/1973, (May 23), pp. 325–326.

*Primary Examiner*—Robert Spitzer
*Attorney, Agent, or Firm*—Oblon, Fisher, Spivak, McClelland & Maier

[57] ABSTRACT

A selective gas separator composed essentially of a reaction product of copper compound with an imidazole, a pyrazole, a triazole and/or a tetrazole.

17 Claims, No Drawings

4,662,905

SELECTIVE GAS SEPARATOR

BACKGROUND OF THE INVENTION

1. Field of the Invention

The present invention relates to a selective gas separator, and more particularly to a selective gas separator useful particularly for the separation of carbon monoxide.

2. Description of the Prior Art

For the preparation of a feed gas for chemical syntheses, it is an important technical subject to concentrate carbon monoxide from e.g. a gas obtained by the steam reforming or partial oxidation of hydrocarbons such as natural gas, light naphtha or heavy oil, or from a by-product gas from an iron-making process.

As a process for separating and concentrating carbon monoxide from a gas mixture containing carbon monoxide, there has been known an absorption method in which carbon monoxide is absorbed in an aqueous ammonium cuprous salt solution or an aqueous hydrochloric acid cuprous salt solution, or in a toluene solution of aluminum copper (I) chloride known as COSORB method, or a low temperature processing which is fundamentally different from the absorption method. However, these methods have problems such that heating is required for the release of carbon monoxide, the apparatus is expensive, or the operation cost is high.

Various polymer membranes have been known as membranes useful for the separation of gases from a gas mixture. However, the gas permeability constant of such membranes is relatively small, and a material having a higher permeability constant is desired. In the case where the membrane is liquid, it is usually possible to obtain a high permeability constant since the solubility constant and diffusion constant of a gas are thereby great. Further, if such a liquid membrane contains a substance which exhibits a reversible interaction selectively with a certain gas, it is possible to further increase the permeability of that gas. On the other hand, the selectivity of the membrane is attributable to the difference, among the gases, in the solubility in the membrane and the difference, among the gases, in the diffusion rate in the membrane. Accordingly, when the membrane contains a substance which exhibits a reversible interaction selectively with a particular gas, as mentioned above, the solubility of that gas can exclusively be increased, whereby the selectivity can remarkably be increased.

For the use of such a membrane containing a substance which exhibits a reversible interaction selectively with a certain gas, there have been known many instances, for example, the separation of carbon dioxide by means of an aqueous solution of an alkali metal bicarbonate (Japanese Examined Patent Publication No. 1176/1970), the separation of an olefin by means of an aqueous solution of silver nitrate (Japanese Examined Patent Publication No. 31842/1978), and the separation of nitrogen monoxide by means of a formamide solution of ferrous chloride (A.I Ch E Journal, vol 16, No. 3, p 405, 1970). These liquid membranes are used as being supported on a support. Further, with respect to the separation of carbon monoxide, it is known to use an aqueous hydrochloric acid solution of copper chloride. However, in this case, there is a drawback that a highly concentrated aqueous hydrochloric acid solution must be used. Furthermore, in the case where the secondary side (i.e. the outlet side) of the permeation is to be maintained under reduced pressure, there will be a difficulty that steam or hydrogen chloride gas permeates and mixes with other gas.

SUMMARY OF THE INVENTION

The present inventors have conducted extensive research for substances which have the above-mentioned selective reversible interaction with certain gases, particularly on substances having such reversible interaction selectively with carbon monoxide, and finally found that a membrane supporting a reaction product of a copper compound with a variety of imidazoles, pyrazoles, triazoles and/or tetrazoles, remarkably accelerates the permeation of carbon monoxide, and thus exhibits a very high selectivity for the separation of carbon monoxide and a high permeation rate for carbon monoxide.

Further, it has been found that as a method for separating a particular gas, particularly carbon monoxide, by means of the reaction product of a copper compound with various imidazoles, pyrazoles, triazoles and/or tetrazoles, it is effective to employ (1) a method wherein a gas mixture is contacted with a solution containing the reaction product whereby the particular gas, particularly carbon monoxide, in the gas mixture is selectively absorbed by the solution and thereby separated from the gas mixture, and thereafter, the absorbed gas, particularly carbon monoxide, is released by changing the pressure and/or temperature of the above solution, or (2) a method wherein a solution containing such a reaction product is supported on a membrane as a support, and permitted to selectively absorb a particular gas, particularly carbon monoxide, from a gas mixture, and the pressure at the other side of the membrane is reduced so that the particular gas such as carbon monoxide is selectively withdrawn through the membrane.

Namely, the present invention provides a selective gas separator composed essentially of a reaction product of a copper compound with an imidazole, a pyrazole, a triazole and/or a tetrazole. Specifically, the selective gas separator may be a gas permeable membrane on which the reaction product is supported, or a liquid absorbent containing the reaction product.

Now, the present invention will be described in detail with reference to the preferred embodiments.

DETAILED DESCRIPTION OF THE INVENTION

There is no particular restriction to the copper compound which may be employed in the present invention. However, as the copper compound, there may be mentioned cuprous chloride, cupric chloride, cuprous oxide, cupric oxide, cuprous bromide, cupric bromide, cuprous cyanide, cupric cyanide, copper thiocyanate, copper fluoride, copper iodide, copper sulfide or copper sulfate. These copper compounds may be used alone or in combination as a mixture. Among them, cuprous iodide, cuprous thiocyanate and cuprous chloride are particularly preferred as the copper compound for the present invention.

The imidazole includes imidazole and its derivatives. Namely, there may be mentioned imidazole, 1-methylimidazole, 1-phenylimidazole, 1-benzylimidazole, 2-methylimidazole, 2-propylimidazole, 2-phenylimidazole, 2-undecylimidazole, 2-heptadecylimidazole, 4-methylimidazole, 4-phenylimidazole, 1,2-dimethylimidazole, 1,4-dimethylimidazole, 2,4-dimethylimidazole, 4,5-dimethylimidazole, 1,4,5-trimethylimidazole, 2,4,5-trimethylimidazole, 1-ethyl-2-methylimidazole, 2-ethyl-4-methylimidazole, 4-methyl-2-phenylimidazole, 2,4-diphenylimidazole, 4,5-diphenylimidazole, 2,4,5-triphenylimidazole, 2,4,5-triphenylimidazole, 2,2'-biimidazole, 2-bromoimidazole, 2-bromo-4-methylimidazole, 4-bromoimidazole, 4-bromo-1-methylimidazole, 4-bromo-2-methylthiazole, 4-bromo-5-methylimidazole, 2,4-dibromoimidazole, 4,5-dibromoimidazole, 4,5-dibromo-1-methylimidazole, 2,4,5-tribromoimidazole, 5-chloro-1-methylimidazole, 5-chloro-1-ethyl-2-methylimidazole, 5-chloro-1-ethyl-2-phenylimidazole, 2,4,5-triiodoimidazole, 4-chloromethylimidazole, 5-chloromethyl-1-methylimidazole, 5-chloromethyl-4-methylimidazole, 1-benzyl-2-chloromethylimidazole, 2-hydroxymethylimidazole, 4-hydroxymethylimidazole, 5-hydroxymethyl-1-methylimidazole, 5-hydroxymethyl-4-methylimidazole, 1-($\beta$-hydroxyethyl)imidazole, 4-($\beta$-hydroxyethyl)imidazole, 5-($\beta$-hydroxyethyl)-4-methylimidazole, 4-nitroimidazole, 1-methyl-5-nitroimidazole, 2-methyl-4-nitroimidazole, 1,2-dimethyl-5-nitroimidazole, 4-methyl-5-nitroimidazole, 2-aminoimidazole, 4-aminoimidazole, 1-(3-aminopropyl)imidazole, 5-amino-4-methylimidazole, 2-phenylazoimidazole, 2-methyl-5-phenylazoimidazole, histamine, 1-($\beta$-aminoethyl)imidazole, 2-($\beta$-aminoethyl) imidazole, 4-aminomethylimidazole, 1-(3-dimethylaminopropylimidazole, 4-imidazole-aldehyde, 1-methylimidazole-5-aldehyde, 4-methylimidazole-5-aldehyde, 2-imidazolephenyl ketone, 5-acetyl-4-methylimidazole, ethyl 1-imidazolecarboxylate, ethyl 4-methylimidazole-1-carboxylate, ethyl 4-methylimidazole-5-carboxylate, imidazole-2-carboxylic acid, 4-methylimidazole-2-carboxylic acid, imidazole-4-carboxylic acid, 2-methylimidazole-4-carboxylic acid, 4-methylimidazole-5-carboxylic acid, imidazole-4,5-dicarboxylic acid, 2-methylimidazole-4,5-dicarboxylic acid, 2-ethylimidazole-4,5-dicarboxylic acid, methyl 4-aminoimidazole-5-carboxylate, ethyl 4-aminoimidazole-5-carboxylate, 4-aminoimidazole-5-carboxylic acid amide, 1-methyl-4-nitroimidazole-5-carboxylic acid, ethyl 5-amino-1-methylimidazole-4-carboxylate, ethyl 4-amino-2-phenylimidazole-5-carboxylate, 2-aminoimidazole-4,5-dicarboxylic acid, histidine, carnosine, anserine, hercynine, pyroclavine, mercaptoimidazole, imidazolinethione, 1-($\beta$-hydroxyethyl)-2-mercaptoimidazole, 4-($\beta$-hydroxyethyl)-2-mercaptoimidazole, 2-mercaptoimidazole-4-carboxylic acid, 2-mercapto-1-imidazolyl acetic acid, $\beta$-(2-mercapto-4-imidazolyl)propionic acid, 5-amino-2-mercapto-1-methylimidazole-4-carboxylic acid, 2-mercapto-L-histidine, ergothioneine, 4-phenyl-1-imidazole-sulfonic acid, imidazole-2-sulfonic acid, 4-methylimidazole-2-sulfonic acid, 4,5-diphenylimidazole-2-sulfonic acid, imidazole-4-sulfonic acid, 4-methylimidazole-5-sulfonic acid, 2-methyl-2-imidazoline, 2-phenyl-2-imidazoline, 2benzyl-2-imidazoline, 1,2-diphenyl-2-imidazoline, 2,4,5-triphenyl-2-imidazoline, 2,2'-bis(2-imidazoline), 2-hydroxymethyl-2-imidazoline, 2-nitroamino-2-imidazoline, 4-methyl-2-nitroamino-2-imidazoline, 2-imidazolone, 4-methyl-2-imidazolone, 1,3-dimethyl-2-imidazolone, 1,3,4-trimethyl-2-imidazolone, 4,5-dimethyl-2-imidazolone, 4,5-diphenyl-2-imidazolone, 4-aminomethyl-2-imidazolone, 2-imidazolone-4-carboxylic acid, 1,3-dimethyl-2-imidazolone-4-carboxylic acid, 5-ethoxycarbonyl-4-methyl-2-imidazolone, 5-benzoyl-4-methyl-2-imidazolone, 2-methyl-4-imidazolone, 2-phenyl-4-imidazolone, 2-benzyl-4-imidazolone, 2-methyl-5-phenyl-4-imidazolone, 5-methyl-2-phenyl-4-imidazolone, 4-benzylidene-2-phenyl-5-imidazolone, 1-benzyl-4-benzylidene-2-phenyl-5-imidazolone, 2,5-diphenylimidazolone, 5,5-diphenylimidazolone, 4-imidazolone-2-carboxylic acid, 5,5-dimethyl-4-imidazoline-thione, 2-imidazolidone, biotin, hydantoin, creatinine, allantoin, parabanic acid, imidazolidine-2-thione, benzoimidazole, 1-methylbenzoimidazole, 1-ethylbenzoimidazole, 1-vinylbenzoimidazole, 1-phenylbenzoimidazole, 1-benzylbenzoimidazole, 2-methylbenzoimidazole, 2-ethylbenzoimidazole, 2-vinylbenzoimidazole, 2-phenylbenzoimidazole, 2-benzylbenzoimidazole, 1,2-dimethylbenzoimidazole, 2-benzyl-1-methylbenzoimidazole, 5,6-dimethylbenzoimidazole, hydroxybenzoimidazole, benzoimidazolone, 2-hydroxyethyl-benzoimidazole, 1-glycosyl benzoimidazole, vitamin $B_{12}$, oxobenzoimidazole, 2-methyloxobenzoimidazole, 2-aminobenzoimidazole, 2-amino-methylbenzoimidazole, 2-diethylaminomethylbenzoimidazole, 2-($\beta$-aminoethyl)benzoimidazole, 2-anilinobenzoimidazole, 4-aminobenzoimidazole, 5-aminobenzoimidazole, 5-amino-2-methylbenzoimidazole, 4-amino-2-methylbenzoimidazole, 5,6-diamino-2-methylbenzoimidazole, 2-guanidinobenzoimidazole, 2-(o-aminophenyl)benzoimidazole, 2-benzoimidazole carboxylic acid, 1-methylbenzoimidazole-2-carboxylic acid, 5-methyl-2-benzoimidazole carboxylic acid, 4-benzoimidazole carboxylic acid, 5-benzoimidazole carboxylic acid, 2-methyl-5-benzoimidazole carboxylic acid, 2,5-benzoimidazole carboxylic acid, 4,5-benzoimidazole dicarboxylic acid, 2-benzoimidazolylacetic acid, $\beta$-(2-benzoimidazolyl)propionic acid, $\beta$-(2-benzoimidazolyl)alanine and 2-mercaptobenzoimidazole. Among them, imidazole, 1-methylimidazole and 2-methylimidazole may be mentioned as preferred imidazoles. These imidazoles may be used alone or in combination as a mixture.

On the other hand, the pyrazole includes pyrazole and its derivatives. As specific compounds, there may be mentioned those disclosed at pages 258 to 335 of Grand Organic Chemistry (published by Asakura Shoten, compiled by Munio Kotake, Vol 15, 1967, 5th Edition). Namely, the pyrazole includes a pyrazole, a pyrazoline, a pyrazolone, a pyrazolidine, a pyrazolidone and an indazole. As specific compounds, there may be mentioned pyrazole, 1-methylpyrazole, 3-methylpyrazole, 3,5-dimethylpyrazole, 4-phenylpyrazole, 3,5-dimethyl-1-allylpyrazole, vinylpyrazole, 4-chloropyrazole, hydroxypyrazole, 4-aminopyrazole, 1-pyrazole carboxylic acid, 2-pyrazoline, 3-methyl-2-pyrazoline, 5-methyl-1-phenyl-2-pyrazoline, 2-pyrazoline-3-carboxylic acid, 5-pyrazolone, 3-methyl-5-pyrazolone, 3-amino-5-pyrazolone, 1-phenylpyrazolidine, 3-methyl-1-phenyl-5-pyrazolidone, indazole, 1-methylindazole and 3-bromoindazole.

The triazole includes triazole and its derivatives. As specific compounds, there may be mentioned those disclosed at pages 369 to 407 in the above-mentioned Grand Organic Chemistry. Namely, as the triazole, there may be mentioned 1,2,3-triazole, benzotriazole, 1,2,4-triazole, 1-methyl-1,2,3-triazole, 4-phenyl-1,2,3-triazole, 5-amino-1,4-dimethyl-1,2,3-triazole, 4-cyan-1,2,3-triazole, benzotriazole, 1-hydroxybenzotriazole, 1-methyl-1,2,4-triazole, 1-phenyl-1,2,4-triazole, 3-chloro-1,2,4-triazole and 1-amino-1,2,4-triazole.

The tetrazole includes tetrazole and its derivatives. As specific compounds, there may be mentioned those disclosed at pages 408 to 432 of the above-mentioned Grand Organic Chemistry. Namely, as the specific compounds, there may be mentioned tetrazole, 1-methyltetrazole, 2-methyltetrazole, 1,5-diphenyltetrazole, 5-hydroxytetrazole and 1-amino-5-phenyltetrazole.

The reaction of the copper compound with the imidazole, the pyrazole, the triazole and/or the tetrazole is conducted under the following conditions.

As the copper compound, the imidazole, the pyrazole, the triazole and the tetrazole, the respective commercial products may be used as they are, or after purifying them.

In the case where the imidazole, etc. are liquid, they may be employed as a solvent by themselves, or other solvent may be employed.

When the imidazole, etc. can be used as a solvent by themselves, the concentration of a substance which exhibits a reversible interaction with a particular gas such as carbon monoxide can be made high, whereby the permeation can be facilitated.

In the case where the imidazole, etc. are solid, it is preferred to use them in the form of a solution or a slurry in a solvent. In this case, the higher the solubility in the solvent is, the more the permeation will be facilitated. As the solvent, there may be employed any type so long as it is capable of dissolving the imidazole, the pyrazole, the triazole and/or the tetrazole. For instance, there may be employed a ketone, an ester, an ether, an alcohol, an amine, an amide, other nitrogen-containing compounds, sulfur-containing compounds, phosphorus-containing compound or halogen-containing compounds. Acetone, ethyl acetate, acetonitrile, methanol and the like are proper from the viewpoint that they are capable of readily dissolving the imidazole, etc. However, they have a high vapour pressure, and accordingly when they are used in the form of a permeable membrane where the secondary side of the permeation is kept under reduced pressure, they readily evaporate, permeate and mix with separated gas, such being undesirable. In such a case, it is advisable to conduct the operation at a temperature below zero centigrade.

On the other hand, in the case where a solvent having a relatively low vapour pressure, such as acetophenone, N-methyl-2-pyrrolidone, γ-butyrolactone, ethylene glycol, tetraethylene glycol dimethyl ester, polyethylene glycol or glycerin, is used, the operation may be conducted at room temperature.

Further, when the operation is conducted at a high temperature, a solvent such as benzophenone which is solid at room temperature, may be employed.

The molar ratio of the imidazole, the pyrazole, the triazole and/or the tetrazole to the copper compound is usually more than 0.1 when they are liquid. However, in order to obtain high levels of permeability and selectivity, the molar ratio of the imidazole, the pyrazole, the triazole and/or the tetrazole to the copper compound is preferably more than 0.1 and less than 100, more preferably more than 0.5 and less than 50.

On the other hand, in the case where a solvent is employed, the ratio of the imidazole, the pyrazole, the triazole and/or the tetrazole to the solvent is usually more than 0.001. In this case, the ratio of the imidazole, the pyrazole, the triazole and/or the tetrazole to the copper compound is selected within the above-mentioned range.

The reaction is usually conducted at a temperature of from 0° to 200° C., preferably in an inert gas stream.

In the case where a solvent is employed, it is preferred firstly to dissolve the imidazole, the pyrazole, the triazole and/or the tetrazole in the solvent, and then to add the copper compound. Further, it is possible to take out the solid component (the reaction product) by a suitable method such as the vacuum drying or the precipitation, and then to dissolve the materials again in the solvent.

Now, methods for separating a particular gas, particularly carbon monoxide, by means of the reaction product of the copper compound with the imidazole, the pyrazole, the triazole and/or the tetrazole, will be described.

In a first method, a gas mixture is contacted with a solution containing the above-mentioned reaction product, whereby a certain gas, especially carbon monoxide, in the gas mixture, is selectively absorbed by the solution, and then the pressure and/or the temperature of the solution is changed to release the absorbed gas. This operation is repeated, whereby the specific gas, particularly carbon monoxide, can selectively be separated. In this case, the pressure under which the gas is absorbed by the reaction product of the copper compound with the imidazole, the pyrazole, the triazole and/or the tetrazole, may be at any level so long as it is higher than the ambient pressure. However, in view of the gas absorption, the equilibrium between absorption and desorption, and the absorption rate, the absorption operation is preferably conducted at a high pressure of at least 1 atm. In order to release the absorbed gas, the pressure should be as low as possible to increase the releasing rate. The releasing operation is preferably conducted at a pressure less than 1 atm, more preferably at most 100 mmHg. This releasing operation may be carried out by bringing the pressure of the entire system to a reduced pressure, or by supplying an inert gas so that the partial pressure of the gas to be released becomes to be less than 1 atm., preferably at most 100 mmHg.

The temperature for the absorption operation is not critical. However, the lower the temperature, the more efficient the absorption becomes. Thus, the temperature is usually not higher than 100° C., preferably not higher than 50° C. Likewise, the temperature for releasing the absorbed gas is not critical. However, in this case, the higher the temperature, the better. Thus, the temperature is usually at least room temperature, preferably from 50° to 300° C.

It is of course possible to conduct the absorption and the desorption by changing both conditions of the pressure and the temperature. In this case, it is preferred that the absorption is conducted under a low temperature and high pressure condition, and the desorption is conducted under a high temperature and low pressure condition.

In a second method, a solution containing the reaction product of the copper compound with the imidazole, the pyrazole, the triazole and/or the tetrazole, is supported on a membrane as a support, the reaction product thus supported on the membrane is permitted to selectively absorb a certain gas, particularly carbon monoxide, from a gas mixture, the pressure at the other side of the membrane is reduced so that the specific gas such as carbon monoxide can selectively be separated through the membrane. In this case, the support used to support the reaction product of the copper compound with the imidazole, the pyrazole, the triazole and/or the tetrazole, may be any membrane so long as it has high gas permeability. Further, there is no particular restriction as to the manner for supporting the reaction product on the membrane, so long as the selective permeation of the gas, particularly carbon monoxide, can thereby be carried out. For instance, there may be mentioned a method wherein the reaction product in a liquid form or in the form of a solution in a solvent, is filled in pores of a porous support, a method wherein the reaction product is trapped in a network structure of a cross-linked polymer formed on a support, a method wherein the reaction product is maintained in a liquid film form having a predetermined thickness on the support, or a method wherein the reaction product is dissolved or dispersed in oriented molecules such as liquid crystals formed on the support.

There is no particular restriction to the material for the membrane which may be used as the support. As the material for the membrane, there may be mentioned an organic polymer such as a regenerated cellulose, a cellulose ester, a polycarbonate, a polyester, teflon, nylon, an acetyl cellulose, a polyacrylonitrile, a polyvinyl alcohol, a polymethyl methacrylate, a polysulfone, a polyethylene, a polypropylene, a polyvinyl pyridine, a polyphenylene oxide, a polyphenylene oxide sulfonic acid, a polybenzimidazole, a polyimidazopyrrolone, a polypiperazine amide, a polystyrene, a polyamino acid, a polyurethane, a polyamino acid-polyurethane copolymer, a polysiloxane, a polysiloxane-polycarbonate copolymer, a polytrimethyl vinylsilane, collagen, a polyion complex, a polyurea, a polyamide, a polyimide, a polyamide imide, a polyvinyl chloride or sulfonated polyfurfuryl alcohol, or an inorganic substance such as glass, alumina, silica, silica alumina, carbon or metal.

The shape of the support may be flat, tubular, spiral or hollow. The support may be porous in its entirety, or may be an anisotropic membrane having a high density layer only on its surface, or a uniform membrane. Further, it may be a material on which a thin layer of other material is formed by e.g. vapour deposition, coating, polymerization or plasma polymerization. The overall thickness is not particularly limited, but is usually within a range of from 10 to 1000 $\mu$m. Such a support may be used by laminating it on another support of a different material.

The thickness of the layer of the reaction product of the copper compound with the imidazole, the pyrazole, the triazole and/or the tetrazole, supported on the above-mentioned support, is usually at least a few angstroms, and is not limited to a particular range. However, in a case where a liquid membrane of the reaction product is used under no agitation condition, the thickness is preferably as thin as possible to obtain a higher permeation rate. On the other hand, if the thickness is too thin, the permeation rate of gases other than the intended gas will also be increased, whereby the separation efficiency tends to decrease. The optimum thickness of the membrane varies depending upon the equilibrium constant and the constants of the rates in the association and dissociation between the gas and the reaction product, or on other conditions. However, the thickness of the membrane is usually within a range of from 0.01 to 50,000 $\mu$m, preferably from 0.1 to 10,000 $\mu$m. In a case where liquid membrane is used under stirring, the membrane may be thick, but the diffusion of the gas, the reaction product and the complex are accelerated.

Various methods may be employed in the case where a gas is separated by means of a membrane on which the reaction product of the copper compound with the imidazole, the pyrazole, the triazole and/or the tetrazole, is supported. Usually, however, such a membrane is used to create a difference in the partial pressure of the gas to be separated as between the respective sides of the membrane, as is the case where a gas is separated by a usual polymer film. Otherwise, it is also possible to employ a method wherein a container containing the reaction product of the copper compound with the imidazole, the pyrazole, the triazole and/or the tetrazole or its solution, is provided independently of the membrane cell, and the liquid is circulated from the container to the surface of the support membrane of the membrane cell (i.e. the primary side of the membrane) by a pump. In this case, it is also possible to employ a method wherein e.g. carbon monoxide is adequately absorbed in the liquid pool in the container, the dissolved or absorbed carbon monoxide is continuously dissociated or desorbed from the reaction product on the surface of the membrane and led to the secondary side of the membrane by maintaining the secondary side of the membrane under reduced pressure, and then the liquid from which carbon monoxide has been removed is returned to the container and carbon monoxide is again dissolved in the returned liquid. This series of operations is continuously repeated to continuously obtain carbon monoxide in high selectivity. In this case, it is possible to facilitate the release of carbon monoxide by differentiating the temperature of the membrane cell from the temperature of the liquid pool. The temperature at the membrane cell is not restricted to any particular range. However, it is usual to employ a temperature within a range of from 0° to 200° C.

The gas separator thus obtained can advantageously be used particularly for the separation of carbon monoxide. For instance, it is thereby possible to separate mainly carbon monoxide in high yield from a synthesis gas obtained by the steam reforming or partial oxidation of hydrocarbons such as natural gas, light naphtha or heavy oil, or from a gas mixture containing carbon monoxide, which is obtainable as a by-product gas from the gasification of coal or iron making, and to use the carbon monoxide thus obtained, as a starting material for various chemical reactions.

Now, the present invention will be described with reference to Examples. However, it should be understood that the present invention is by no means restricted by these specific Examples.

EXAMPLE 1

Into a 100 ml flask, 2.7 g of cuprous thiocyanate and 7 ml of 1-methylimidazole were charged and reacted in a nitrogen stream at room temperature for 4 hours under stirring. Then, 8 g of the liquid reaction product was sampled, under a nitrogen stream, into an egg-plant type flask equipped with a three way stop-cock and having an internal capacity of about 10 ml. One branch tube of the stop-cock was connected to a bomb for nitrogen (hereinafter referred to simply as "$N_2$") or carbon monoxide (hereinafter referred to simply as "CO") via a pressure-controlling device, and the other branch tube of the stop-cock was connected to a vacuum pump via an empty flask having a capacity of 1 liter and a manometer. The $N_2$ gas or CO gas was, respectively, dissolved in the reaction product of cuprous thiocyanate with 1-methylimidazole, and then discharged to the evacuated flask by switching the three way stop-cock, whereupon the amount of the discharged $N_2$ or CO was determined from the pressure increase measured by the manometer. In this case, no substantial pressure increase of the manometer due to the discharge of $N_2$ was observed, and the pressure increase was less than 1 mmHg, and the amount of the discharge of $N_2$ was less than 1.7 ml. Whereas, the pressure increase of the manometer due to the discharge of CO reached 60 mmHg upon expiration of 5 minutes. Then, CO was withdrawn to bring the pressure to 0 mmHg, and the discharge of CO was again conducted. This operation was repeated, whereupon the amount of the discharged CO was measured and found to be 273 ml.

From the amounts of the discharged $N_2$ and the discharged CO, the separation factor of CO to $N_2$ by the reaction product of cuprous thiocyanate with 1-methylimidazole is assumed to be at least 160, i.e. 273 ml (discharged CO)/1.7 ml (discharged $N_2$)=at least 160.

Apart from the above, when the above-mentioned solution of the reaction product which absorbed CO, was heated, a release of gas was observed when the temperature reached about 50° C.

EXAMPLE 2

Into a 100 ml flask, 1.82 g of cuprous thiocyanate, 3.10 g of triazole and 15 ml of N-methylpyrrolidone as a solvent, were fed under the nitrogen atmosphere, and reacted at room temperature for 9 hours and at 80° C. for further 1 hour. By using this reaction solution, the absorption and desorption operations were conducted in the same manner as in Example 1, whereby the amounts of the discharged $N_2$ and the discharged CO were measured, and the separation factor was determined.

No substantial pressure increase due to the discharge of $N_2$ was observed, and the pressure increase was less than 1 mmHg, and the amount of the discharged $N_2$ was less than 1.7 ml. On the other hand, the amount of the discharged CO was 35 ml as determined from the pressure increase, and the separation factor of CO to $N_2$ was at least 20.

EXAMPLE 3

Under a dried nitrogen stream, 1.82 g of cuprous thiocyanate (commercial product itself) was fed to a flask, and 15 ml of 1-methylimidazole (commercial product subjected to dehydration and deoxidation) was added thereto. The mixture was stirred, and after a while, a uniform solution was obtained.

On the other hand, an asymmetric membrane of polytrimethylvinylsilane was mounted on a cell for measurement of gas permeability. (The skin layer side was set to be the primary side.) The nitrogen permeation rate of this membrane was $1.05 \times 10^{-5}$ cm/cm$^2$.sec.cmHg.

Under an inert gas stream, 12.5 ml of the above-mentioned uniform solution was added on the membrane, and stirred. Both the primary side and the secondary side were maintained under reduced pressure. Then, 1 kg/cm$^2$ of each gas was supplied to the primary side, while the secondary side was vacuumed, whereupon the permeability of various gases was measured by gas chromatography. As the test gases, the respective pure gases were employed. The results are shown in Table 1. It is evident that the permeation of carbon monoxide was selectively facilitated. The temperature at the measurement was 25° C.

Further, according to this method, no liquid drop of N-methylimidazole passed through the membrane to the secondary side during the experiment, and no vapour of N-methylimidazole passed through the membrane since N-methylimidazole has a low vapour pressure. (The experiment was conducted with a provision of a trap tube, and even a single drop was not trapped.)

COMPARATIVE EXAMPLE 1

In the same manner as in Example 3, 12.5 ml of 1-methylimidazole was fed into a flask, and the gas permeability was measured. The results are shown in Table 1.

EXAMPLE 4

The reproducibility of Example 3 was investigated and affirmed. The temperature for the measurement was changed to 70° C., whereby the permeation rate improved.

EXAMPLE 5

The permeation rate of $N_2$ by a polytrimethylvinylsilane membrane as the base membrane, was $6.7 \times 10^{-4}$ cm/cm$^2$.sec.cmHg. The permeation rates of $N_2$ by the base membranes used in the following Examples were within a range of from $10^{-3}$ to $10^{-4}$ cm/cm$^2$.sec cmHg.

The same substance as used in Example 3 was used except that the concentration of copper was changed. Namely, cuprous thiocyanate/1-methylimidazole=5.46 g/14 ml.

EXAMPLE 6

The same substance (the same composition) as used in Example 5, was used. However, the asynmmetric membrane of polytrimethylvinylsilane as the base membrane was arranged inversely so that the skin layer was set to be the secondary side.

EXAMPLE 7

To 1.0 g of cuprous iodide (commercial product itself), 10 ml of 1-methylimidazole was added, and the mixture was stirred. After a while, a uniform solution was obtained. A polytrimethylvinylsilane membrane was mounted, and 10 ml of the above uniform solution was added. While stirring the solution, the gas permeability was measured by using pure gases and gas mixtures. The permeation rate was slightly higher in the case of the gas mixtures, i.e. where the partial pressure of carbon monoxide was lower.

EXAMPLE 8

To 15 ml of N-methylpyrrolidone (commercial product subjected to dehydration and deoxidation), 3.06 g of imidazole (commercial product itself) was dissolved, and then 2.86 g of cuprous iodide was added. The mixture was stirred, and after a while a uniform solution was obtained.

By using 10 ml of this solution, the gas permeability was investigated in the same manner as in Example 3.

In this case as well, no drop of N-methylpyrrolidone passed through the membrane to the secondary side during the experiment, and no vapour of N-methylpyrrolidone passed through the membrane as N-methylpyrrolidone has a low vapour pressure.

EXAMPLE 9

The reaction product was prepared in the same manner as in Example 8 except that 3.69 g of 2-methylimidazole (commercial product manufactured by Shikoku Kasei Kogyo K.K. itself) was used instead of imidazole in Example 8, and the permeability was investigated.

raphy. As the test gases, the respective pure gases were employed.

TABLE 1

| Example | Carrier (A) Copper compound | Carrier (B) Imidazole | Carrier Solvent | Concentration of (A) mol/l | Molar ratio (B)/(A) | Feed Gas | Temp. at the time of measurement (°C.) |
|---|---|---|---|---|---|---|---|
| 3 | CuSCN | 1-Methyl imidazole | — | 1.0 | 14.2 | 76 cm/Hg of respective pure gases | 25 |
| 4 | " | 1-Methyl imidazole | — | 1.0 | 14.2 | 76 cm/Hg of respective pure gases | 25 70 |
| 5 | " | 1-Methyl imidazole | — | 3.2 | 4.4 | 76 cm/Hg of respective pure gases | 25 |
| 6* | " | 1-Methyl imidazole | — | 3.2 | 4.4 | 76 cm/Hg of respective pure gases | 25 70 |
| 7 | CuI | 1-Methyl-imidazole | — | 1.05 | 13.5 | 76 cm/Hg of respective pure gases CO 11.1 cm Hg $H_2$ 10.3 cm Hg | 25 25 |
| 8 | " | Imidazole | N—methyl pyrrolidone | 1.0 | 3.0 | 76 cm Hg of respective pure gases | 25 |
| 9 | " | 2-Methyl-imidazole | N—methyl pyrrolidone | 1.0 | 3.0 | 76 cm Hg of respective pure gases | 25 |
| Comparative Example 1 | — | 1-Methyl-imidazole | — | — | — | 76 cm Hg of respective pure gases | 25 |

| Example | Permeation rate (cm³/cm² · sec · cm Hg) $R_{CO}$ | $R_{H_2}$ | $R_{CH_4}$ | $R_{N_2}$ | Ratio of the permeation rates $R_{CO}/R_{H_2}$ | $R_{CO}/R_{CH_4}$ | $R_{CO}/R_{N_2}$ |
|---|---|---|---|---|---|---|---|
| 3 | $1.1 \times 10^{-5}$ | $8.4 \times 10^{-7}$ | $1.1 \times 10^{-6}$ | $3.2 \times 10^{-7}$ | 13.1 | 10.0 | 34.7 |
| 4 | $1.1 \times 10^{-5}$ | — | — | $3.1 \times 10^{-7}$ | — | — | 36.8 |
|   | $1.7 \times 10^{-5}$ | $1.5 \times 10^{-6}$ | $2.0 \times 10^{-6}$ | $9.4 \times 10^{-7}$ | 11.1 | 8.1 | 17.6 |
| 5 | $1.1 \times 10^{-5}$ | $2.0 \times 10^{-7}$ | $2.8 \times 10^{-7}$ | — | 55.0 | 38.9 | — |
| 6* | $1.6 \times 10^{-6}$ | $1.3 \times 10^{-7}$ | $1.6 \times 10^{-7}$ | $4.1 \times 10^{-8}$ | 12.4 | 9.8 | 38.9 |
|   | $2.9 \times 10^{-6}$ | $5.9 \times 10^{-7}$ | $4.6 \times 10^{-7}$ | $1.7 \times 10^{-7}$ | 4.9 | 6.3 | 17.1 |
| 7 | $1.8 \times 10^{-5}$ | $9.6 \times 10^{-7}$ | $1.6 \times 10^{-6}$ | $3.0 \times 10^{-7}$ | 18.6 | 11.5 | 60.0 |
|   | $2.8 \times 10^{-5}$ | $1.1 \times 10^{-6}$ | — | — | 24.9 | — | — |
| 8 | $7.8 \times 10^{-6}$ | $9.1 \times 10^{-7}$ | $1.2 \times 10^{-6}$ | $4.3 \times 10^{-7}$ | 8.5 | 6.5 | 18.3 |
| 9 | $1.4 \times 10^{-5}$ | $1.2 \times 10^{-6}$ | $1.9 \times 10^{-6}$ | $4.1 \times 10^{-7}$ | 12.0 | 7.2 | 33.7 |
| Comparative Example 1 | $1.4 \times 10^{-6}$ | $1.2 \times 10^{-6}$ | $2.3 \times 10^{-6}$ | $7.3 \times 10^{-7}$ | 1.2 | 0.6 | 1.9 |

*The support membrane was reversed so that the skin layer is located below.

EXAMPLE 10

Under a dry nitrogen stream, 3.10 g of 1,2,4-triazole (commercial product itself) was fed into a flask, and 15 ml of N-methylpyrrolidone (commercial product subjected to dehydration and deoxidation) was added thereto. The mixture was stirred, and after a while, a uniform solution was obtained.

To this solution, 1.82 g of cuprous thiocyanate (commercial product itself) was added, and the mixture was stirred. After a while, a substantially uniform solution was obtained.

On the other hand, an asymmetric membrane of polytrimethylvinylsilane was mounted on a cell for measurement of gas permeability, and the skin layer side was set to be the primary side. The nitrogen permeation rate of this membrane was $9.0 \times 10^{-5}$ cm/cm².sec.cmHg.

Under an inert gas stream, 12.5 ml of the above uniform solution was added on this membrane, and stirred. Both the primary side and the secondary side were maintained under reduced pressure. Then, 1 kg/cm² of each gas was supplied to the primary side, while the secondary side was vacuumed, whereupon the permeability of various gases was measured by gas chromatography. As the test gases, the respective pure gases were employed.

The results are shown in Table 2. It is evident from the table that the permeability of carbon monoxide is remarkably high as compared with other gases, thus indicating that the permeation of carbon monoxide gas was selectively facilitated.

Further, according to this method, no drop of N-methylimidazole passed through the membrane to the secondary side during the experiment, and no vapour of N-methylimidazole passed through the membrane as N-methylimidazole has a low vapour pressure. (The experiment was conducted with a provision of a trap tube, and even a single drop was not trapped.)

COMPARATIVE EXAMPLE 2

The permeation rates of various gases were measured in the same manner as in Example 10 except that 12.5 ml of N-methylpyrrolidone only was used instead of the solution of the reaction product of cuprous thiocyanate with 1,2,4-triazole. The results are shown in Table 2.

EXAMPLE 11

The permeation rates of various gases were measured in the same manner as in Example 10 except that 4.32 g of 3,5-dimethylpyrazole was used instead of 1,2,4-triazole.

The nitrogen permeation rate of the polytrimethylvinylsilane membrane used, was $3.72 \times 10^{-4}$ cm/cm$^2$.sec. cmHg. The results are shown in Table 2.

EXAMPLES 12 and 13

The permeation rates of various gases were measured in the same manner as in Example 10 by using a reaction product of copper (I) iodide or copper (I) chloride with 3,5-dimethyl-1-allylpyrazole. The results are shown in Table 2.

TABLE 2

| | Carrier | | | | | |
|---|---|---|---|---|---|---|
| | (A) Copper compound | (B) Pyrazole, triazole and/or tetrazole | Solvent | Concentration of (A) (mol/l) | Molar ratio (B)/(A) | Feed gas |
| Example 10 | CuSCN | 1,2,4-triazole | N—methylpyrrolidone | 1.0 | 3.0 | Pure gas |
| Example 11 | CuSCN | 3,5-dimethylpyrazole | N—methylpyrrolidone | 1.0 | 3.0 | " |
| Example 12 | CuI | 3,5-dimethyl-1-allyipyrazole | N—methylpyrrolidone | 1.0 | 1.0 | " |
| Example 13 | CuCl | 3,5-dimethyl-1-allyipyrazole | N—methylpyrrolidone | 1.0 | 2.0 | " |
| Comparative Example 2 | — | — | N—methylpyrrolidone | — | — | " |

| | Temp. at the time of measurement (°C.) | Permeation rate (cm$^3$/cm$^2 \cdot$ sec $\cdot$ cm Hg) | | | Ratio of the permeation rates | |
|---|---|---|---|---|---|---|
| | | $R_{CO}$ | $R_{N_2}$ | $R_{CH_4}$ | $R_{CO}/R_{N_2}$ | $R_{CO}/R_{CH_4}$ |
| Example 10 | 25 | $6.3 \times 10^{-6}$ | $3.6 \times 10^{-7}$ | $1.4 \times 10^{-6}$ | 17.3 | 4.4 |
| Example 11 | 25 | $7.1 \times 10^{-6}$ | $4.8 \times 10^{-7}$ | $1.9 \times 10^{-6}$ | 14.8 | 3.8 |
| Example 12 | 25 | $3.4 \times 10^{-6}$ | $5.7 \times 10^{-7}$ | $2.3 \times 10^{-6}$ | 5.9 | 1.4 |
| Example 13 | 35 | $3.4 \times 10^{-6}$ | $8.9 \times 10^{-7}$ | $3.3 \times 10^{-6}$ | 3.9 | 1.03 |
| Comparative Example 2 | 25 | $9.6 \times 10^{-7}$ | $5.1 \times 10^{-7}$ | $2.0 \times 10^{-6}$ | — | — |

What is claimed is:

1. A selective gas separator composed essentially of a reaction product of cuprous chloride, cuprous bromide, cuprous thiocyanate or cuprous iodide with an imidazole, a pyrazole, a triazole, a tetrazole, or mixtures thereof.

2. The selective gas separator according to claim 1, which is a gas permeable membrane on which said reaction product is supported.

3. The selective gas separator according to claim 2, wherein said gas permeable membrane is formed from regenerated cellulose, a cellulose ester, a polycarbonate, a polyester, teflon, nylon, an acetyl cellulose, a polyacrylonitrile, a polyvinyl alcohol, a polymethylmethacrylate, a polysulphone, a polyethylene, a polypropylene, a polyvinyl pyridine, a polyphenylene oxide, a polyphenylene oxide sulphonic acid, a polybenzimidezole, a polyimidazopyrrolone, a polypiperazine amide, a polystyrene, a polyamino acid, a polyurethane, a polyamino acid-polyurethane copolymer, a polysiloxane, a polysiloxane-polycarbonate copolymer, a polytrimethylvinylsilane, collagen, a polyion complex, a polyurea, a polyamide, a polyimide, a polyamideimide, a polyvinylchloride or a sulphonated polyfurfuryl alcohol.

4. The selective gas separator according to claim 2, wherein said gas permeable membrane ranges in thickness from 10 to 1,000 μm.

5. The selective gas separator according to claim 1, which is a liquid absorbent containing said reaction product.

6. The selective gas separator according to claim 5, wherein a gas is absorbed in the liquid absorbent under low temperature and high pressure conditions and desorbed therefrom under high temperature and low pressure conditions.

7. The selective gas separator according to claim 5, wherein said liquid absorbent is a solution of said reaction product in the liquid imidazole, pyrazole, triazole or tetrazole compound which reacts with said inorganic copper compound.

8. The selective gas separator according to claim 7, wherin the molar ratio of said imidazole, pyrazole, triazole or tetrazole compound to said solvent is greater than 0.001:1.

9. The selective gas separator according to claim 5, wherein said liquid absorbent is a solution or slurry of said reaction product in an organic solvent which is capable of dissolving said imidazole, pyrazole, triazole or tetrazole compound.

10. The selective gas separator according to claim 1, wherein said gas separator selectively separates carbon monoxide.

11. The selective gas separator according to claim 1, wherein the molar ratio of the imidazole, the pyrazole, the triazole and/or the tetrazole to the copper compound, is more than 0.1.

12. The selective gas separator according to claim 1, wherein said imidazole compound is a member selected from the group consisting of imidazole, 1-methylimidazole, 1-phenylimidazole, 1-benzylimidazole, 2-methylimidazole, 2-propylimidazole, 2-phenylimidazole, 2-undecylimidazole, 2-heptadecylimidazole, 4-methylimidazole, 4-phenylimidazole, 1,2-dimethylimidazole, 1,4-dimethylimidazole, 2,4-dimethylimidazole, 4,5-dimethylimidazole, 1,4,5-trimethylimidazole, 2,4,5-trimethylimidazole, 1-ethyl-2-methylimidazole, 2-ethyl-4-methylimidazole, 4-methyl-2-phenylimidazole, 2,4-diphenylimidazole, 4,5-diphenylimidazole, 2,4,5-triphenylimidazole, 2,4,5-triphenylimidazole, 2,2′-biimidazole, 2-bromoimidazole, 2-bromo-4-methylimidazole, 4-bromoimidazole, 4-bromo-1-methylimidazole, 4-bromo-2-methylthiazole, 4-bromo-5-methylimidazole, 2,4-dibromoimidazole, 4,5- dibromoimidazole, 4,5-dibromo-1-methylimidazole, 2,4,5-tribromoimidazole, 5-chloro-1-methylimidazole, 5-chloro-1-ehyl-2-methylimidazole, 5-chloro-1-ethyl-2-phenylimidazole, 2,4,5-triiodoimidazole, 4-chloromethylimidazole, 5-chloromethyl-1-methylimidazole, 5-chloromethyl-4-methylimidazole, 1-benzyl-2-chloromethylimidazole, 2-hydroxymethylimidazole, 4-hydroxymethylimidazole, 5-hydroxymethyl-1-methylimidazole, 5-hydroxymethyl-4-methylimidazole, 1-($\beta$-hydroxyethyl)imidazole, 4-($\beta$-hydroxyethyl)imidazole, 5-($\beta$-hydroxyethyl)-4methylimidazole, 4-nitroimidazole, 1-methyl-5-nitroimidazole, 2-methyl-4-nitroimidazole, 1,2-dimethyl-5-nitroimidzole, 4-methyl-5-nitroimidazole, 2-aminoimidazole, 4-aminoimidazole, 1-(3-aminopropyl)imidazole, 5-amino-4-methylimidazole, 2-phenylazoimidazole, 2-methyl-5-phenylazoimidazole, histamine, 1-($\beta$-aminoethyl)imidazole, 2-($\beta$-aminoethyl)imidazole, 4-aminomethylimidazole, 1-(3-dimethylaminopropyl)imidazole, 4-imidazole-aldehyde, 1-methylimidazole-5-aldehyde, 4-methylimidazole-5-aldehyde, 2-imidazolephenyl ketone, 5-acetyl-4-methylimidazole, ethyl 1-imidazolecarboxylate, ethyl 4-methylimidazole-1-carboxylate, ethyl 4-methylimidazole-5-carboxylate, imidazole 2-carboxylic acid, 4-methylimidazole-2-carboxylic acid, imidazole-4-carboxylic acid, 2-methylimidazole-4-carboxylic acid, 4-methylimidazole-5-carboxylic acid, imidazole-4,5-dicarboxylic acid, 2-methylimidazole-4,5-dicarboxylic acid, 2-ethylimidazle-4,5-dicarboxylic acid, methyl 4-aminoimidazole-5-carboxylate, ethyl 4-aminoimidazole-5-carboxylate, 4-aminoimidazole-5-carboxylic acid amide, 1-methyl-4-nitroimidazole-5-carboxylic acid, ethyl 5-amino-1-methylimidazole-4-carboxylate, ethyl 4-amino-2-phenylimidazole-5-carboxylate, 2-aminoimidazole-4,5-dicarboxylic acid, histidine, carnosine, anserine, hercynine, pyroclavine, mercaptoimidazole, imidazolinethione, 1-($\beta$-hydroxyethyl)-2-mercaptoimidazole, 4-($\beta$-hydroxyethyl)-2-mercaptoimidazole, 2-mercaptoimidazole-4-carboxylic acid, 2-mercapto-1-imidazolyl acetic acid, $\beta$-(2-mercapto-4-imidazolyl)propionic acid, 5-amino-2-mercapto-1-methyl-imidazole-4-carboxylic acid, 2-mercapto-L-histidine, ergothioneine, 4-phenyl-1-imidazole-sulfonic acid, imidazole-2-sulfonic acid, 4-methylimidazole-2-sulfonic acid, 4,5-diphenylimidazole-2-sulfonic acid, imidazole-4-sulfonic acid, 4-methylimidazole-5-sulfonic acid, 2-methyl-2-imidazoline, 2-phenyl-2-imidazoline, 2-benzyl-2-imidazoline, 1,2-diphenyl-2-imidazoline, 2,4,5-triphenyl-2-imidazoline, 2,2'-bis(2-imidazoline), 2-hydroxymethyl-2-imidazoline, 2-nitroamino-2-imidazoline, 4-methyl-2-nitroamino-2-imidazoline, 2-imidazolone, 4-methyl-2-imidazolone, 1,3-dimethyl 2-imidazolone, 1,3,4-trimethyl-2-imidazolone, 4,5-dimethyl-2-imidazolone, 4,5 diphenyl-2-imidazolone, 4-aminomethyl-2-imidazolone, 2-imidazolone-4-carboxylic acid, 1,3-dimethyl-2-imidazolone-4-carboxylic acid, 5-ethoxycarbonyl-4-methyl-2-imidazolone, 5-benzoyl-4-methyl-2-imidazolone, 2-methyl-4-imidazolone, 2-phenyl-4-imidazolone, 2-benzyl-4-imidazolone, 2-methyl-5-phenyl-4-imidazolone, 5-methyl-2-phenyl-4-imidazolone, 4-benzylidene-2-phenyl-5-imidazolone, 1-benzyl-4-benzylidene-2-phenyl-5-imidazolone, 2,5-diphenylimidazolone, 5,5-diphenylimidazolone, 4-imidazolone- 2-carboxylic acid, 5,5-dimethyl-4-imidazoline-thione, 2-imidazolidone, biotin, hydantoin, creatinine, allantoin, parabanic acid, imidazolidine-2-thione, benzoimidazole, 1-methylbenzoimidazole, 1-ethylbenzoimidazole, 1-vinylbenzoimidazole, 1-phenylbenzoimidazole, 1-benzylbenzoimidazole, 2-methylbenzoimidazole, 2-ethylbenzoimidazole, 2-vinylbenzoimidazole, 2-phenylbenzoimidazole, 2benzylbenzoimidazole, 1,2-dimethylbenzoimidazole, 2-benzyl-1-methylbenzoimidzole, 5,6-dimethylbenzoimidazole, hydroxybenzoimidazole, benzoimidazolone, 2-hydroxyethyl-benzoimidazole, 1-glycosyl benzoimidazole, vitamin $B_{12}$, oxobenzoimidazole, 2-methyloxobenzoimidazole, 2-aminobenzoimidazole, 2-amino-methylbenzoimidazole, 2-diethylaminomethylbenzoimidazole, 2-($\beta$-aminoethyl)benzoimidazole, 2 anilinobenzoimidazole, 4-aminobenzoimidazole, 5-aminobenzoimidazole, 5-amino-2-methylbenzoimidazole, 4-amino-2-methylbenzoimidazole, 5,6-diamino-2-methylbenzoimidazole, 2-guanidinobenzoimidazole, 2-(o-aminophenyl)benzoimidazole, 2-benzoimidazole carboxylic acid, 1-methylbenzoimidazole-2-carboxylic acid, 5-methyl-2-benzoimidazole carboxylic acid, 4-benzoimidazole carboxylic acid, 5-benzoimidazole carboxylic acid, 2-methyl-5-benzoimidazole carboxylic acid, 2,5-benzoimidazole carboxylic acid, 4,5-benzoimidazole dicarboxylic acid, 2-benzoimidazolyl acetic acid, $\beta$-(2 benzoimidazolyl)propionic acid, $\beta$-(2-benzoimidazolyl)alanine and 2-mercaptobenzoimidazole, and mixtures thereof.

13. The selective gas separator according to claim 12, wherein said imidazole compound is a member selected from the group consisting of imidazole, 1-methylimidazole, 2-methylimidazole and mixtures thereof.

14. The selective gas separator according to claim 1, wherein said pyrazole compound is a pyrazole, a pyrazoline, a pyrazolone, a pyrazolidine, a pyrazolidone or an indazole.

15. The selective gas separator according to claim 1, wherein said pyrazole compound is a member selected from the group consisting of pyrazole, 1-methylpyrazole, 3-methylpyrazole, 3,5-dimethylpyrazole, 4-phenylpyrazole, 3,5-dimethyl-1-allylpyrazole, vinylpyrazole, 4-chloropyrazole, hydroxypyrazole, 4-aminopyrazole, 1-pyrazole carboxylic acid, 2-pyrazoline, 3-methyl-2-pyrazoline, 5-methyl-1-phenyl-2-pyrazoline, 2-pyrazoline-3-carboxylic acid, 5-pyrazoline, 3-methyl-5-pyrazolone, 3-amino-5-pyrazolone, 1-phenylpyrazolidine, 3-methyl-1-phenyl-5-pyrazolidone, indazole, 1-methylinadazole, 3-bromoindazole, and mixtures thereof.

16. The selective gas separator according to claim 1, wherein said triazole compound is a member selected from the group consisting of 1,2,3-triazole, benzotriazole, 1,2,4-triazole, 1-methyl-1,2,3-triazole, 4-phenyl-1,2,2-triazole, 5-amino-1,4-dimethyl-1,2,3-triazole, 4-cyan-1,2,3-triazole, benzotriazole, 1-hydroxybenzotriazole, 1-methyl-1,2,4-triazole, 1-phenyl-1,2,4-triazole, 3-chloro-1,2,4 triazole, 1-amino-1,2,4-triazole, and mixtures thereof.

17. The selective gas separator according to claim 1, wherein said triazole compound is a member selected from the group consisting of tetrazole, 1-methyltetrazole, 2-methyltetrazole, 1,5-diphenyltetrazole, 5-hydroxytetrazole, 1-amino-5-phenyltetrazole, 5-hydroxytetrazole, 1-amino 5-phenyltetrazole, and mixtures thereof.

* * * * *